June 5, 1928.  
D. B. WILLIAMS  
SHELLING DEVICE FOR CRACKED NUTS  
Original Filed Aug. 3, 1923   5 Sheets-Sheet 4

1,672,443

Inventor  
Dick B. Williams,

WITNESSES:—  
By  
Attorney

June 5, 1928.
D. B. WILLIAMS
1,672,443
SHELLING DEVICE FOR CRACKED NUTS
Original Filed Aug. 3, 1923    5 Sheets-Sheet 5
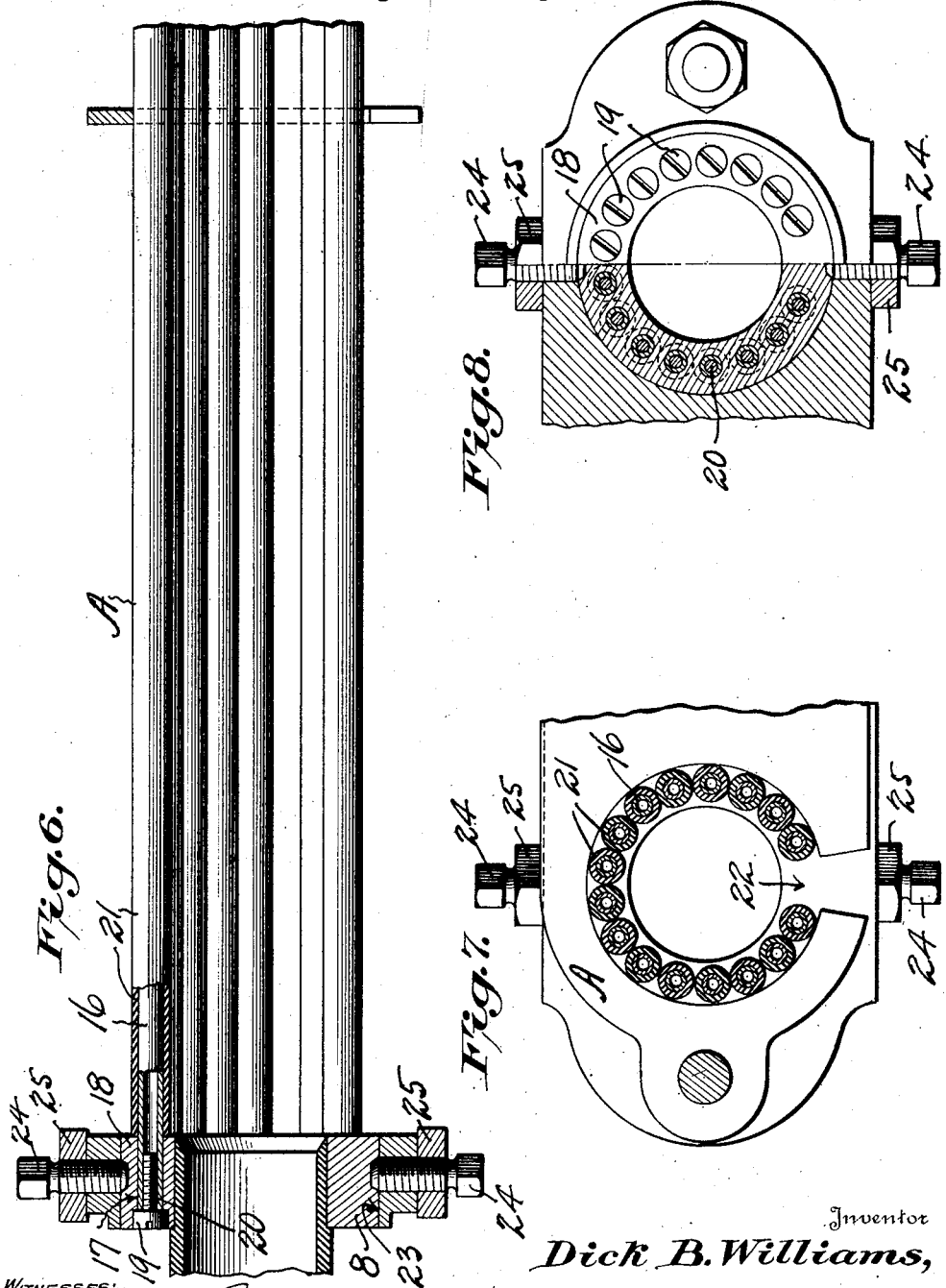
Inventor
Dick B. Williams, Patented June 5, 1928.

1,672,443

UNITED STATES PATENT OFFICE.

DICK B. WILLIAMS, OF CHICAGO, ILLINOIS, ASSIGNOR TO JOHN W. LESLIE, TRUSTEE, OF CHICAGO, ILLINOIS.

SHELLING DEVICE FOR CRACKED NUTS.

Application filed August 3, 1923, Serial No. 655,444. Renewed April 4, 1928.

This invention relates to machines for shelling nuts, and more particularly to a device possessing special utility and capacity as a sheller for cracked nuts.

Primarily the invention is intended to provide a practical solution of the problem of successfully and economically shelling cracked pecan nuts by mechanical means. In that industry, the machines now in general use for cracking the pecan nuts do not thoroughly and properly crack a sufficiently large percentage of the nuts to permit of practical and economical shelling by mechanical means. For the foregoing reason the custom of hand shelling, or picking out the meats from the shells by hand, has been universally followed. The practical development, however, of the basic features of the pecan cracking machine set forth and described in specifications and claims of U. S. Patent No. 1,132,817 issued to Dick B. Williams March 23, 1915, has produced a cracking machine of such increased efficiency as to admit of mechanically shelling and separating its product at a great reduction of time and labor, as compared with the hand method; and at the same time eliminating the unsanitary features necessarily connected with the hand method.

In carrying out the complete process contemplated two separate and distinct functions are performed, viz: shelling and separating. By shelling is meant the detachment of the meat portions from the shell portions, leaving them in a detached form, but in the one mass, not separated the one from the other. By separating is meant the isolation of these detached portions, the one from the other, in two homogeneous masses. The shelling device is the subject of this application. The separating device will be made the subject of a separate application.

Therefore, the present invention has for one of its principal objects an improved mechanical means or method of releasing the nut meats from the clinging particles of shell, and to do that in a way to obtain a maximum deshelling action without injury to the meats, at the same time recovering a large percentage of substantially perfect halves.

A further object of the invention is to provide a shelling means of the character referred to which may be constructed in one or more units according to the capacity required and which will operate to eject for re-cracking purposes any improperly cracked nuts or those which have not been de-shelled by the action of the shelling container.

Another object of the invention is to provide a container for receiving the cracked nuts and for detaching the meats therefrom, in which means are provided for causing the cracked nuts to be jogged into various positions during their passage through the container whereby the meat which is more or less already freed from the shell will be caused thereby to become entirely freed.

A further object of the invention is to provide a container for the purpose described, which is given a very rapid vibration within a restricted amplitude of movement, the vibration being directed in a plane at right angles to the movement of the material.

With the above and other objects in view which will more readily appear as the nature of the invention is better understood, the same consists in the novel construction, combination and arrangement of parts hereinafter more fully described, illustrated and claimed.

In the drawings which show one form of my invention:—

Fig. 6 is an enlarged detail longitudinal sectional view through a portion of the container.

Fig. 7 is a detail sectional view taken on the line 7—7 of Fig. 3.

Fig. 8 is a detail sectional view taken on the line 8—8 of Fig. 3, and

Like reference numerals designate corresponding parts throughout the several figures of the drawings.

Figure 1:
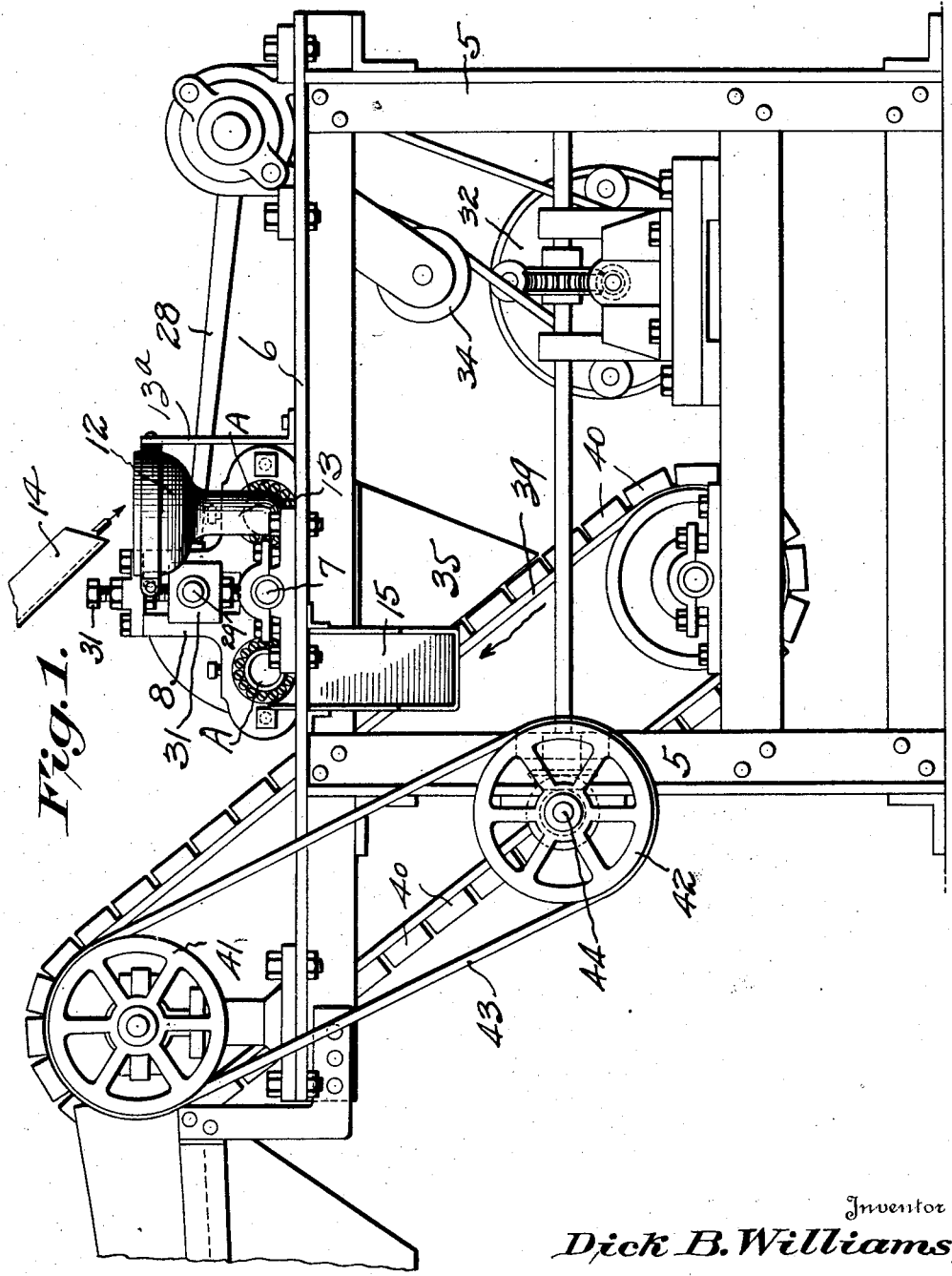
Fig. 1 is a front elevation of a machine embodying my invention.
Figure 2:
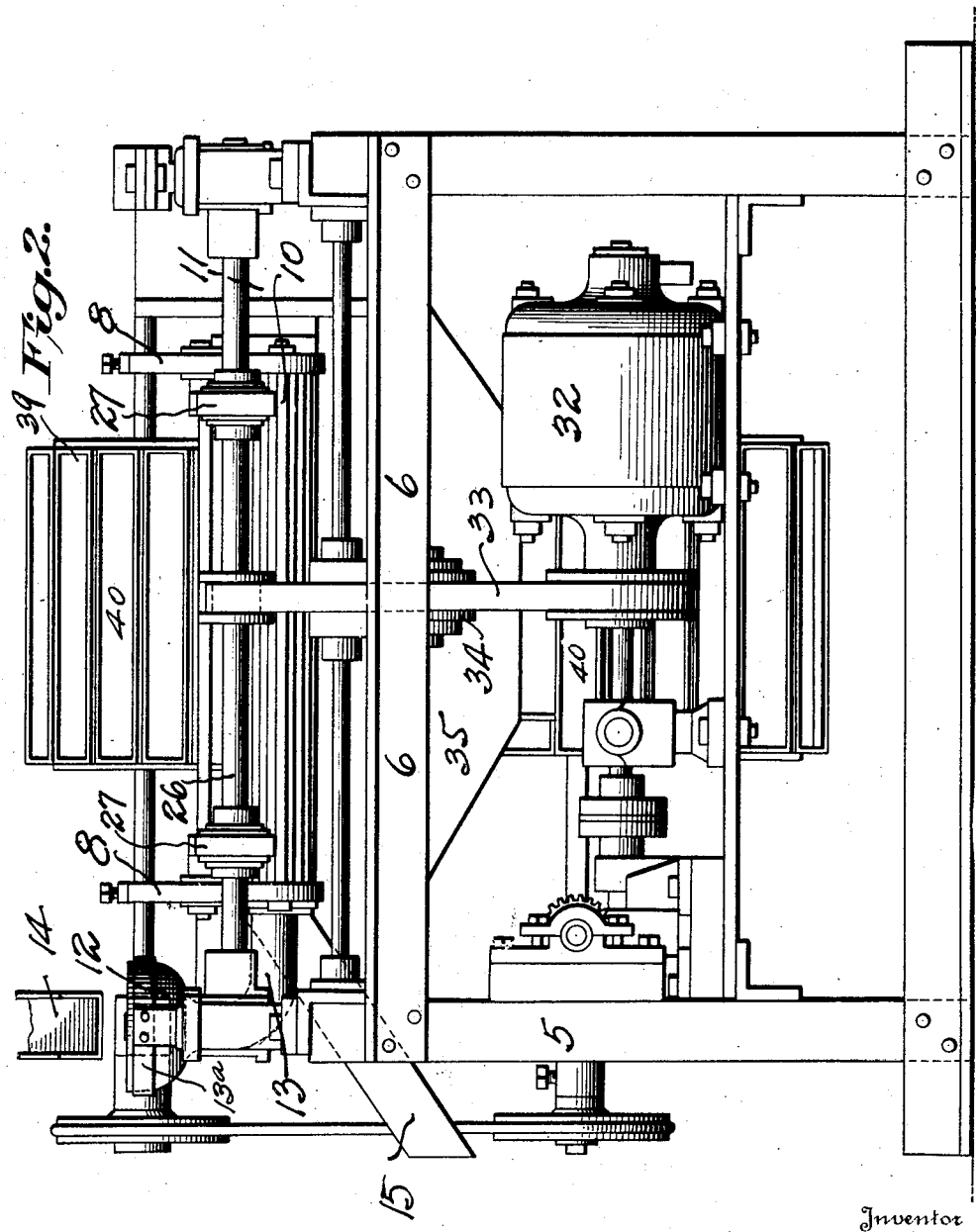
Fig. 2 is an end elevation thereof.
Figure 3:
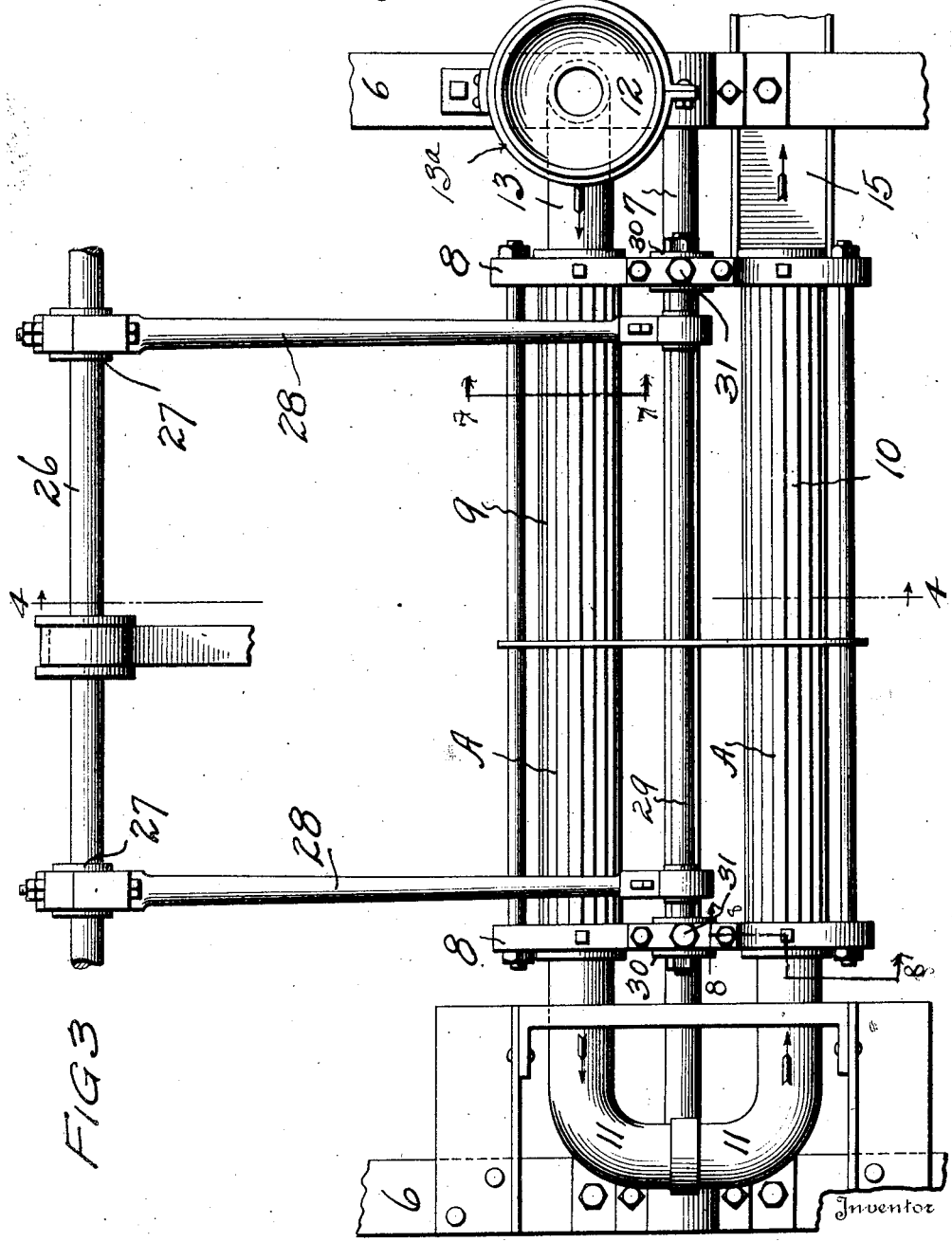
Fig. 3 is an enlarged top plan view showing the separating mechanism.
Figure 4:
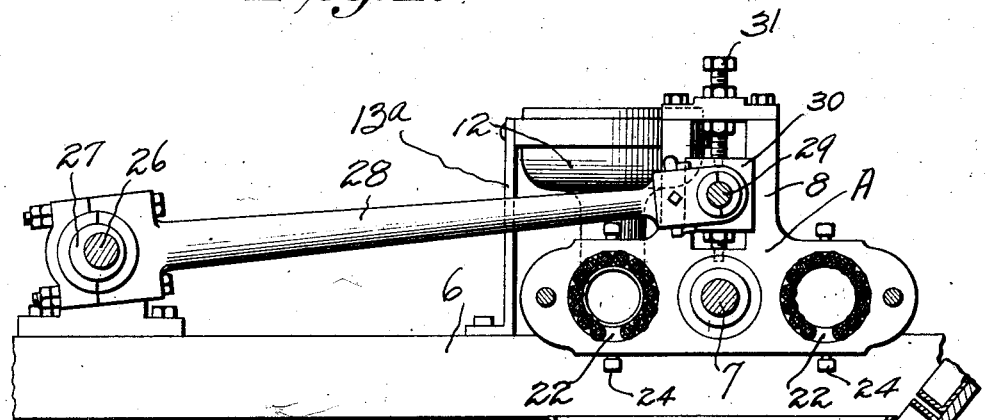
Fig. 4 is a transverse sectional view taken on the line 4—4 of Fig. 3.

In carrying forward the invention any suitable frame-work or supporting structure may be utilized but for illustrative purposes there is shown in the drawings a supporting structure designated generally by the reference numeral 5 and including upper horizontal frame members 6—6 on which is journaled a pivot shaft 7. Pivoted on the shaft 7 is the improved container for receiving the cracked nuts, and this container I have indicated as a whole by the reference letter A.

The primary feature of the invention resides in the construction and action of the shelling container. It may be variously constructed so long as it retains the fundamental structural features and function, as the invention contemplates a tubular or cylindrical shelling container, or container unit of limited diameter presenting a smooth or padded inner surface against which the cracked nuts are impacted and caused to ricochet, and also having separate outlets of proportionate size respectively for the meats and detached shell portions and for the unseparated material or whole unshelled nuts, combined with means for imparting to the container, or container unit, a very rapid vibration of small amplitude. In its simple aspect the vibratory shelling container, or container unit, is in the form of what might be termed a tube having a longitudinal outlet or slot at the bottom and open at both ends, one end of which receives the cracked nuts from a suitable point of supply, the longitudinal bottom slot permitting the exit of detached meat and shell particles, and the other end of which discharges whole uncracked, or improperly cracked unshelled nuts.

The shelling container A may obviously consist of a single tube having the structural and functional features referred to or may be duplicated to be operated in tandem as shown for instance in the example illustrated in the drawings of this application. Accordingly for illustrative purposes that specific embodiment of the invention will now be described though it will be understood that the invention is not limited in its scope to such specific form of construction. Therefore, referring now to the specific embodiment shown in the drawings it will be seen that the container A preferably consists of an elongated tube having separate outlets respectively for the released meats and shells and for the uncracked and unshelled nuts, and it may be found preferable in carrying out the invention to slightly incline the container from the horizontal so as to permit gravity to assist in feeding the contents longitudinally through the tube. Also in order to provide capacity and to prolong the shelling action it may be desirable, as shown in the drawings, to employ a pair of the container units A, rigidly mounted within the same framework so as to be vibrated together and connected at one end in the manner shown.

Proceeding now to a description of the shelling container made up of the two tube units it will be seen that this container is carried by a pair of spaced heads 8—8 which are journaled on the shaft 7. As specifically shown, the container A is composed of two parallel tubes 9 and 10, and a connecting U-tube 11, the tubes 9 and 10 being arranged on opposite sides of and parallel with the pivot shaft 7. A hopper 12 preferably formed of rubber or other cushioning material, is rigidly supported as at $13^a$ at its top end by one of the frame members 6, and its lower end, 13, being flexible, is attached to the adjacent end of the tube 9, the vibratory movement of tube 9 being communicated to 13. The cracked nuts are preferably fed singly direct from a nut cracking machine as cracked into the hopper 12, through the medium of a chute 14, which is disposed above the hopper. By forming the hopper of rubber or other flexible material, the stationary top thereof does not cause the cracked nuts to rebound as they drop into the hopper and the vibration of the flexible bottom facilitates the passage of the nuts and prevents bridging, or choking.

The cracked nuts pass from the hopper through the flexible hopper 12—13, tube 9, U-tube 11 and tube 10, the meats and shells of properly cracked nuts being detached by the vibration of container and discharged through the longitudinal bottom slot, the uncracked and undetached cracked nuts passing outwardly from the tube 10 into a discharge chute 15, being of too great bulk to pass through the longitudinal slot.

I preferably form each of the tubes 9 and 10 by using stock material, that is, material readily purchasable in the open market, and to this end I employ a plurality of hollow rods 16, arranging said rods in parallelism and in a circle and securing the same by inserting the ends of the rods in spaced openings 17 formed in rings 18. Each opening 17 is counterbored at its outer end for receiving the head 19 of a screw 20 which has threaded engagement with the bore of the adjacent hollow rod 16. These screws 20 serve to lock the rings and tubes against relative movement. Prior to the assembling of the structure above noted, each of the rods 16 is preferably covered by a cushioning or padded sleeve 21, preferably a rubber tube. These rods are positioned close together except at one point where a space is left between adjacent rods to form the outlet or slot 22 for the egress of the detached shells and meats. The rings 18 are positioned in corresponding openings 23 formed in the respective heads 18, and are secured thereto against relative movement by means of set screws 24—24 and cooperating lock nuts 25—25. The tubes are set so that the outlet opening 22 for the meats and detached shells is of a width to prevent the passage of such meats except when the latter are presented on edge to the outlet.

In order to vibrate the container A within a small amplitude of movement, I have provided an eccentric shaft 26 with a pair of eccentrics 27, each eccentric being a duplicate of the other and having a small eccentricity, such as, from one-eighth to one-quarter inch. Pitmen 28—28 cooperate with the eccentrics 27, and with a connection rod 29 journaled in vertically adjustable bearings 30—30, which are respectively mounted for sliding movement in the heads 8 directly above the pivot shaft 7. Adjusting screws 31—31 have threaded engagements with the respective heads 8 and with the bearings 30 so as to adjust said bearings, and consequently the connection rod 29, towards or from the pivot shaft 7, thus increasing or decreasing the vibratory or rocking movement of the container. In other words, the closer the connection rod 29 is adjusted toward the pivot shaft 7, the greater will be the amplitude of movement, and the farther away the connection rod 29 is adjusted from the pivot shaft 7, the less vibratory movement will be imparted to the container.

The material, in its passage through the container A, is assisted by gravity, the container preferably extending downwardly from the inlet end to the outlet end.

From the above, it will be noted that I have provided a container having a lining of relatively soft and smooth material, and forming an irregular inner surface, and that the container is provided with an inlet and two outlets, one outlet serving as an exit for the uncracked and undetached nuts and the other outlet providing an exit for the detached meats and shells, said latter outlet extending longitudinally of the container and disposed intermediate said inlet and the first mentioned outlet.

In order to rapidly vibrate the container A, I preferably employ an electric motor 32, which I mount within the supporting structure 5, thus creating a complete and portable machine. This motor drives the eccentric shaft 26, preferably by a belt 33, and a belt tightener 34 serves to maintain proper driving connections, yet permitting of slippage should the apparatus become choked.

Disposed under the container A is a receptacle 35 for receiving the detached meats and shells which are discharged from the container. This receptacle has an open top and downwardly converging side walls 36 and 37. The side wall 37 at its bottom is formed with an outlet 38 for the detached meats and shells and cooperatively associated with this opening is a conveyor, which is indicated as a whole by the numeral 39. This conveyor receives the meats and shell particles and carries them upwardly outside of the wall 37 to a point where they are discharged into the separating device, not shown. This conveyor includes a plurality of buckets 40, which open towards the outlet 38, and these buckets during their travel upwardly along the inclined wall 37 retain the meats against accidental discharge by reason of the wall 37 serving as a closure for said buckets. This conveyor 39 is operated by a driven pulley 41, and a driving pulley 42, said pulleys being operatively connected by a belt 43. The driving pulley 42 is mounted on a shaft 44, which is attached to the supporting structure 5, and this shaft is geared to the motor 32.

Figure 9:
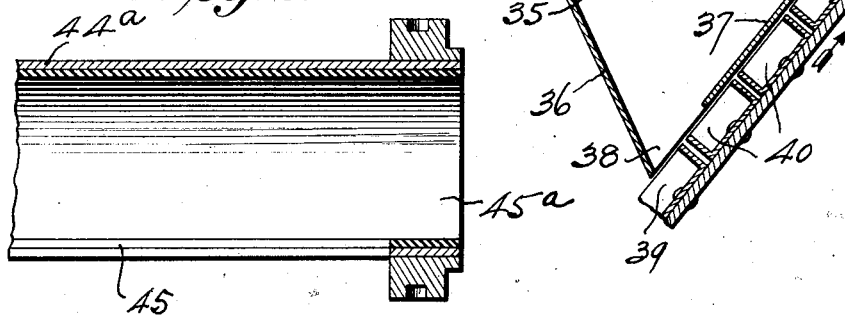
Fig. 9 is a detail sectional view showing a modified form of container construction.
Figure 5:
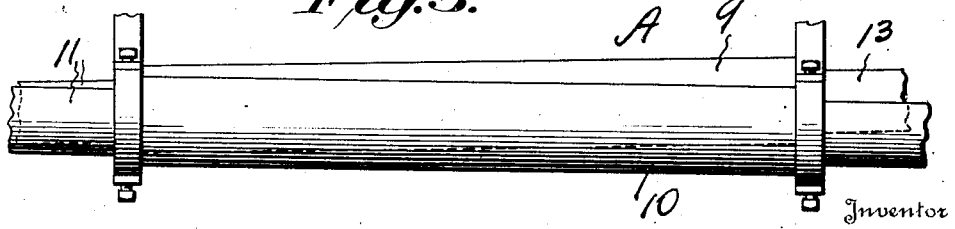
Fig. 5 is a detail side elevation showing the inclination of the container.

The container may be constructed in a different manner as illustrated in Fig. 9. In this figure the conveyor is formed of a metallic tube 44ª having a longitudinally disposed outlet slot 45 extending along its lower side for the egress of the meats and shell particles, and the inner smooth face of the tube 44ª may be covered by a rubber or other yieldable lining 45ª.

In operation, the cracked nuts are discharged from the nut cracking machine through the chute 14, and into the hopper 12. By reason of the hopper being of rubber or equivalent material, the cracked nuts will not be injured and neither will they rebound from the hopper. The cracked nuts then pass through the connection 13 of the hopper, and thence through container to the discharge chute 15. The passage of the material through the container will preferably be assisted by gravity on account of the inclination of the container. Inasmuch as the container is vibrated very rapidly and within a very small amplitude of movement, the cracked nuts will be violently agitated within the container and will be jogged back and forth against the inner surface thereof. The result is that the meats of well cracked pecans will be detached and these meats and the shell portions from which they have been detached, will from their decrease in bulk be discharged through the outlet 22 from the container into the receptacle 35. The uncracked and undetached nuts, from their greater bulk will continue their travel through the container and eventually pass out along the discharge chute 15. The meats and shells which are discharged into the receptacle 35 are carried upwardly by the conveyor 39 to a point where they are discharged into the separating device, not shown.

It will be understood from the foregoing that I do not limit myself to the details of construction described nor to the particular arrangement of the invention illustrated, and therefore changes in the form, proportion and minor details of construction may be resorted to, within the scope of the appended claims, without departing from the spirit or principle or without sacrificing any of the advantages of the invention.

I claim:

1. A shelling device for cracked nuts comprising a tubular container having a longitudinal outlet for released meats and detached shell particles and a terminal outlet for the unshelled nuts, and means for shaking said container in a direction transversely of its length.

2. A shelling device for cracked nuts comprising a tubular container having a relatively soft lining and also provided with a longitudinal outlet for released meats and shell particles and a terminal outlet for the unshelled nuts and means for vibrating the said container.

3. A shelling device for cracked nuts comprising a tubular container having a longitudinal outlet and a terminal outlet respectively of different size, said container also being provided with an irregular interior surface of cushioning material.

4. A shelling device for cracked nuts comprising a tubular container formed by a plurality of longitudinally extending rods, certain of said rods being spaced apart to provide a longitudinally extending outlet for released meats and detached portions of shell, said container being formed adjacent one end thereof with an opening of proportionately larger size than the said longitudinal outlet to provide for the egress of the whole unshelled nut, and means for vibrating said container.

5. A shelling device for cracked nuts comprising a tubular container formed by a plurality of longitudinally extending rods, certain of said rods being spaced apart to provide an egress opening for released meats and detached shell portions, said container being formed adjacent one end thereof with an opening of proportionately larger size for the egress of the whole unshelled nut, tubes of relatively soft material respectively surrounding said rods to form a resultant lining for the container, and means for vibrating said container in a plane at right angles to the plane containing the major axis of the container.

6. A shelling device for cracked nuts comprising a tubular vibratory container having an inlet and having separate longitudinally disposed and terminal outlets respectively for released meats and detached shell portions, and whole unshelled nuts, a stationary hopper for receiving cracked nuts flexibly connected to the container inlet for delivering said cracked nuts from the hopper to the container inlet, and means for vibrating said container.

7. A shelling device for cracked nuts comprising a U-shaped tubular container having a main inlet at one end for receiving the whole cracked nuts singly and having an outlet at its other end for the same, said container also having outlets of proportionately smaller size intermediate said inlet and outlet for the egress of released meats and detached shell portions, and means for vibrating said container.

8. A shelling device for cracked nuts comprising a container having separate outlets of proportionate size respectively for released meats and detached shell portions, and for the whole unshelled nuts, said container including parallel tubular portions and a connecting U-tube, a pivot shaft, and means for pivotally supporting said container on said pivot shaft.

9. A shelling device for cracked nuts comprising a container having separate outlets of proportionate size respectively for released meats and detached shell portions, and for the whole unshelled nuts, said container including parallel tubular portions and a connecting U-tube, a pivot shaft, and means for pivotally supporting said container on said pivot shaft, said parallel tubular portions being disposed on opposite sides of said pivot shaft.

10. A shelling device for cracked nuts comprising a container having an inlet, and separate longitudinally disposed and terminal outlets of proportionate size respectively for released meats and detached shell portions, and for the whole unshelled nuts, means for pivotally supporting said container, and means for oscillating said container about its pivot.

11. A shelling device for cracked nuts comprising a container having an inlet and separate longitudinally disposed and terminal outlets of proportionate size respectively for released meats and detached shell portions, and for the whole unshelled nuts, means for pivotally supporting said container, and means for oscillating said container about its pivot, said oscillating means including adjustable means for varying the amplitude of oscillation of the container.

12. A shelling device for cracked nuts comprising a return bend tubular container having a main inlet at one end for receiving whole cracked nuts and having an outlet at its other end for the same, said container also having an outlet of proportionate smaller size intermediate said inlet and outlet for the egress of released meats and detached shell portions, means for vibrating said container, a receptacle disposed under said container for receiving the discharged meats and detached shell portions and means for conveying same from said receptacle.

13. In a shelling device for cracked nuts a tubular padded container having separate longitudinally extending and terminal outlets of a proportionate size to provide respectively for the egress of the released meats and detached shell particles and for the whole unshelled nuts, and means for imparting a movement to said container to effect the said separation.

14. In a shelling device for cracked nuts, a vibratory container including parallel tubular portions and a connecting U-tube.

15. In a shelling device for cracked nuts, a container including parallel tubular portions and a connecting U-tube, said tubular portions being each formed by a plurality of longitudinally extending rods, certain of said rods being spaced apart to provide an outlet for released meats, and detached shell portions.

16. A shelling device for cracked nuts including a pair of supporting heads respectively formed with openings, a container comprising a pair of spaced rings, a plurality of parallel rods connected to said rings, said rings fitting within the openings of the heads, certain of the rods being spaced apart to form a longitudinally extending outlet for released meats and detached shell portions and all of said rods being grouped to provide a terminal outlet for the unshelled nuts, and means for securing said heads and rings against relative movement.

In testimony whereof I hereunto affix my signature.

DICK B. WILLIAMS.